(12) United States Patent
Lang

(10) Patent No.: US 7,794,310 B2
(45) Date of Patent: Sep. 14, 2010

(54) STUNNING ANIMALS SUCH AS POULTRY WITH GAS

(75) Inventor: Gary Dee Lang, Naperville, IL (US)

(73) Assignee: Praxair Technology, Inc., Danbury, CT (US)

( * ) Notice: Subject to any disclaimer, the term of this patent is extended or adjusted under 35 U.S.C. 154(b) by 206 days.

(21) Appl. No.: 11/230,547

(22) Filed: Sep. 21, 2005

(65) Prior Publication Data

US 2007/0026780 A1 Feb. 1, 2007

Related U.S. Application Data

(63) Continuation-in-part of application No. 11/176,277, filed on Jul. 8, 2005, now abandoned.

(51) Int. Cl.
A22B 3/00 (2006.01)
A22C 21/00 (2006.01)
(52) U.S. Cl. .......................... 452/66; 452/57
(58) Field of Classification Search ............ 452/57–61, 452/66
See application file for complete search history.

(56) References Cited

U.S. PATENT DOCUMENTS

| 2,526,037 A | 12/1948 | Murphy ................ 17/45 |
| 2,737,683 A | 5/1954 | Regensburger ............ 17/1 |
| 3,487,497 A * | 1/1970 | Jorgensen et al. .......... 452/53 |
| 3,828,396 A * | 8/1974 | Wernberg ................ 452/66 |
| 3,916,835 A | 11/1975 | Reynolds |
| 4,107,818 A | 8/1978 | Scott et al. .............. 17/51 |
| 4,888,855 A | 12/1989 | Haumann et al. .......... 17/1 A |
| 5,112,270 A | 5/1992 | Howard et al. ............ 452/66 |
| 5,152,714 A | 10/1992 | Audsley et al. ............ 452/66 |
| 5,186,677 A | 2/1993 | Christensen et al. ........ 452/66 |
| 5,435,776 A | 7/1995 | Owen et al. .............. 452/66 |
| 5,487,699 A | 1/1996 | Tyrrell et al. ............. 452/66 |
| 5,643,072 A | 7/1997 | Lankhaar et al. .......... 452/66 |
| 5,653,629 A | 8/1997 | Audsley et al. ............ 452/66 |
| 5,788,564 A | 8/1998 | Chamberlain ............. 452/66 |
| 5,975,029 A * | 11/1999 | Morimoto et al. ......... 119/843 |
| 6,056,637 A | 5/2000 | Freeland et al. ........... 452/183 |
| 6,126,534 A | 10/2000 | Jacobs et al. ............. 452/66 |
| 6,135,872 A | 10/2000 | Freeland et al. ........... 452/66 |
| 6,174,228 B1 | 1/2001 | Grimsland et al. |
| 6,623,347 B1 | 9/2003 | Grimsland et al. |
| 6,694,918 B2 | 2/2004 | Draft ..................... 119/453 |
| 6,848,987 B2 | 2/2005 | Draft ..................... 452/66 |
| 7,097,552 B2 | 8/2006 | Ovensen et al. |
| 2003/0168019 A1 | 9/2003 | Draft ..................... 119/453 |
| 2004/0038638 A1 | 2/2004 | Ochten .................. 452/66 |
| 2004/0102147 A1 | 5/2004 | Draft |
| 2004/0194721 A1 | 10/2004 | Draft ..................... 119/453 |
| 2006/0009142 A1* | 1/2006 | Cattaruzzi ............... 452/66 |

FOREIGN PATENT DOCUMENTS

| EP | 0852115 A1 | 7/1998 |
| EP | 1609365 A2 | 12/2005 |
| GB | 2063183 A | 6/1981 |
| JP | 62-282535 | * 12/1987 |
| WO | WO 2007008536 A1 | 1/2007 |

* cited by examiner

Primary Examiner—David J Parsley
(74) Attorney, Agent, or Firm—Robert J. Hampsch

(57) ABSTRACT

Animals such as poultry are stunned while still caged and on the vehicle that carries them to a processing plant, by exposing the animal to an atmosphere of gradually lessening oxygen content.

23 Claims, 2 Drawing Sheets

STUNNING ANIMALS SUCH AS POULTRY WITH GAS

This application is a continuation-in-part of application Ser. No. 11/176,277, filed Jul. 8, 2005 now abandoned.

FIELD OF THE INVENTION

The present invention relates to methods and apparatus useful for stunning air-breathing animals such as poultry, by placing them in an atmosphere that when breathed renders them progressively lethargic and then unconscious or dead.

BACKGROUND OF THE INVENTION

Commercial production of poultry (by which is meant chicken and turkey) products destined for sale for consumption customarily is carried out in processing plants. Presently, in about 95% of current processing plants, poultry is brought in by truck in cages from which the poultry is unloaded live by hand. The birds are then hung upside-down on a conveyorized shackle line and their heads are dragged through a brine or water bath. They are then stunned using high voltage electricity just prior to being slaughtered.

Hanging the birds while they are still fully awake can be very troublesome, especially with heavier birds such as tom turkeys which can weigh 40 pounds or more, leading to high labor costs and worker injuries. It is not unusual for the birds to flap their wings, causing joint damage and blood clots in the birds, thus degrading the overall quality of the meat and reducing the yield.

Stunning the poultry with gas as part of the processing regimen presents the advantage that the birds are less likely to engage in extensive movement, thereby reducing the burden to the worker and reducing the risk of damage to the bird. Poultry processors have studied the relative costs of their current methods versus gas stunning and have documented that gas stunning can prevent on the order of $700,000. per shift per year in lost product revenues for a typical turkey processor. Since the majority of processors employ two shifts per day, gas stunning can save on the order of $1.4 million per year.

However, current gas stunning systems are complicated and expensive, with upfront installation costs of 2 to 3 million dollars per line. The installation costs include costs of special cages, mechanized cage handling systems, and additional plant space which usually must be added to the current buildings of the processor.

Thus, there is a need for effective gas stunning techniques, without incurring the complexity and expense of current gas stunning methods and apparatus.

BRIEF SUMMARY OF THE INVENTION

One aspect of the present invention is a method for treating an animal to bring it into a desired state selected from the group consisting of lethargy, unconsciousness, or death, comprising (a) providing the animal at a treatment location alive and confined, in an atmosphere that does not bring the animal breathing it to a state of lethargy, unconsciousness or death, on a vehicle which has transported the confined animal to the treatment location from a location other than the treatment location, (b) while the animal is so confined, reducing the oxygen content of the atmosphere in which the animal is so confined by adding gas other than oxygen to said atmosphere to impart to said atmosphere a composition which brings the animal breathing it to said desired state, and maintaining said composition of said atmosphere at least until the animal breathing it is thereby brought into said desired state, and (c) removing the animal from said confinement and from said vehicle only after the animal has been brought to said desired state.

A preferred embodiment of this method comprises the steps of (A) providing an enclosure having a gas impermeable top, gas impermeable sides joined to the gas impermeable top, a gas impermeable front panel, a gas impermeable rear panel, an entrance in the front panel and an exit in the rear panel, the entrance and exit defining a passageway through the enclosure through which a vehicle on the ground can pass, and a gas impermeable upper plate within the enclosure located below the top of the enclosure, and wherein the front and rear panels, the top and each side define lateral spaces within the enclosure on each side of the passageway, (B) positioning a vehicle having a bottom plate and carrying animals such as poultry in two or more ranks of cages whose walls are permeable to the atmosphere outside the cage walls within the enclosure passageway so that at least one rank of cages is inside the enclosure, (C) establishing an atmosphere flow circuit from the space above the upper plate into one lateral space, through a selected rank or ranks of said cages, into the other lateral space, and then into the space above said upper plate, (D) injecting gas into the atmosphere within said circuit to impart to said atmosphere a composition which brings the animal breathing it to said desired state, and circulating said atmosphere through said circuit at least until the animal in said rank or ranks of cages is brought into said state, (E) exhausting the atmosphere formed in step (D) from said circuit and feeding ambient air into the atmosphere in said circuit, (F) moving the vehicle with respect to the enclosure to remove said selected rank or ranks of cages from said circuit and to place another selected rank or ranks of cages being carried by said vehicle into said circuit, and (G) repeating steps (C) through (F) until the animals in all cages on said vehicle has been treated by steps (C), (D) and (E).

Another aspect of the present invention is apparatus useful for carrying out the aforementioned embodiment, comprising (A) an enclosure having a gas impermeable top, gas impermeable sides joined to the gas impermeable top, a gas impermeable front panel, a gas impermeable rear panel, an entrance in the front panel and an exit in the rear panel, the entrance and exit defining a passageway through the enclosure through which a vehicle on the ground can pass, the front and rear panels, the top and each side defining lateral spaces within the enclosure on each side of the passageway, and a gas impermeable upper plate within the enclosure located below the top of the enclosure, (B) an impeller for circulating an atmosphere through a flow circuit extending from the space above the upper plate into one lateral space, through a selected rank or selected adjacent ranks of cages on a vehicle positioned in said passageway, into the other lateral space, and then into the space above said upper plate, (C) an injector for injecting gas into the atmosphere within said circuit, and (D) apparatus for exhausting the atmosphere within said circuit into the ambient air and feeding ambient air into the atmosphere in said circuit.

As used herein, a "rank" of cages means a cage or cages lying in a vertical plane that extends from one lateral side of the enclosure described herein to the other lateral side. Thus, the term "rank" of cages includes without limitation one cage, or two or more cages stacked vertically, or two or more vertical stacks of cages placed side by side (whether touching each other or not).

The terms "stunning" and "stun" are used herein to mean bringing an animal into a desired state of lethargy, unconsciousness or death.

DETAILED DESCRIPTION OF THE INVENTION

Animals that can be treated by this invention include any that live by breathing the ambient atmosphere. Preferred examples include poultry (i.e. chickens and turkeys), ducks and other birds, as well as mammals such as cattle, calves, sheep, goats and pigs.

The animals that are to be treated by the method of the present invention are transported to a treatment location from another location, preferably from a location at which the animals have been placed into cages or otherwise confined. Then, the cages are transported to the treatment location, such as on a truck or other vehicle. The cages or other structure that confines the animals are of any design that contains the animal and prevents it from escaping, and that permits gaseous atmosphere to pass from outside the cage into and through the cage. Preferably, the tops, bottoms and sides of the cages are planar, to facilitate stacking them onto a vehicle. It is immaterial whether the animals are confined one per cage, or more than one per cage.

The confined animals arrive at the treatment location alive. They are in, and breathing, an ambient atmosphere that does not (yet) bring them to a state of lethargy, unconsciousness or death. Typically, the animals are breathing the ambient air.

Next, steps are taken so that the composition of the atmosphere that the animals are breathing changes to a composition that, when breathed, brings the animals to whichever state is desired by the operator, that is, to a state of lethargy, unconsciousness, or death. It will of course be recognized that animals may pass through one of these states to the next.

The composition of the atmosphere being breathed by the animals is changed so that the oxygen content of that atmosphere is decreased. Changing the composition can be carried out in many different ways. A feature common to all these ways is that the composition changes, and the animals are subjected to breathing the composition, while the animals remain confined on the vehicle.

Figure 1:
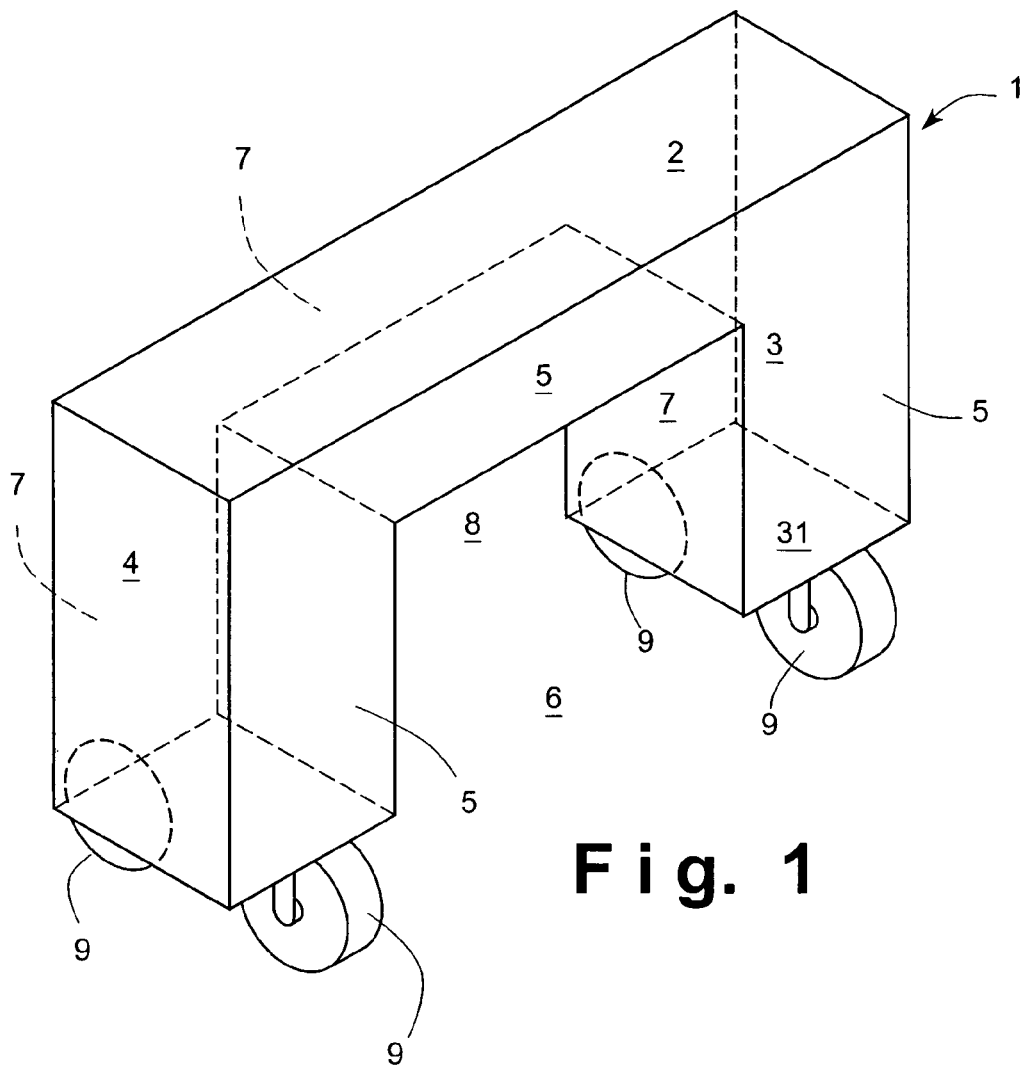
FIG. 1 is a perspective view from the outside of apparatus useful in practicing the invention.
Figure 3:
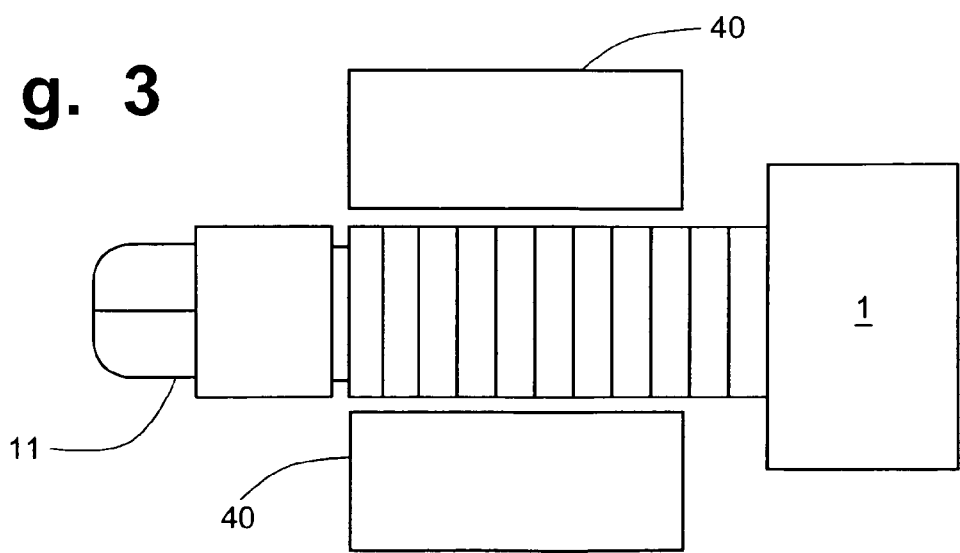
FIG. 3 is a top view of apparatus according to one embodiment of the invention.
Figure 2:
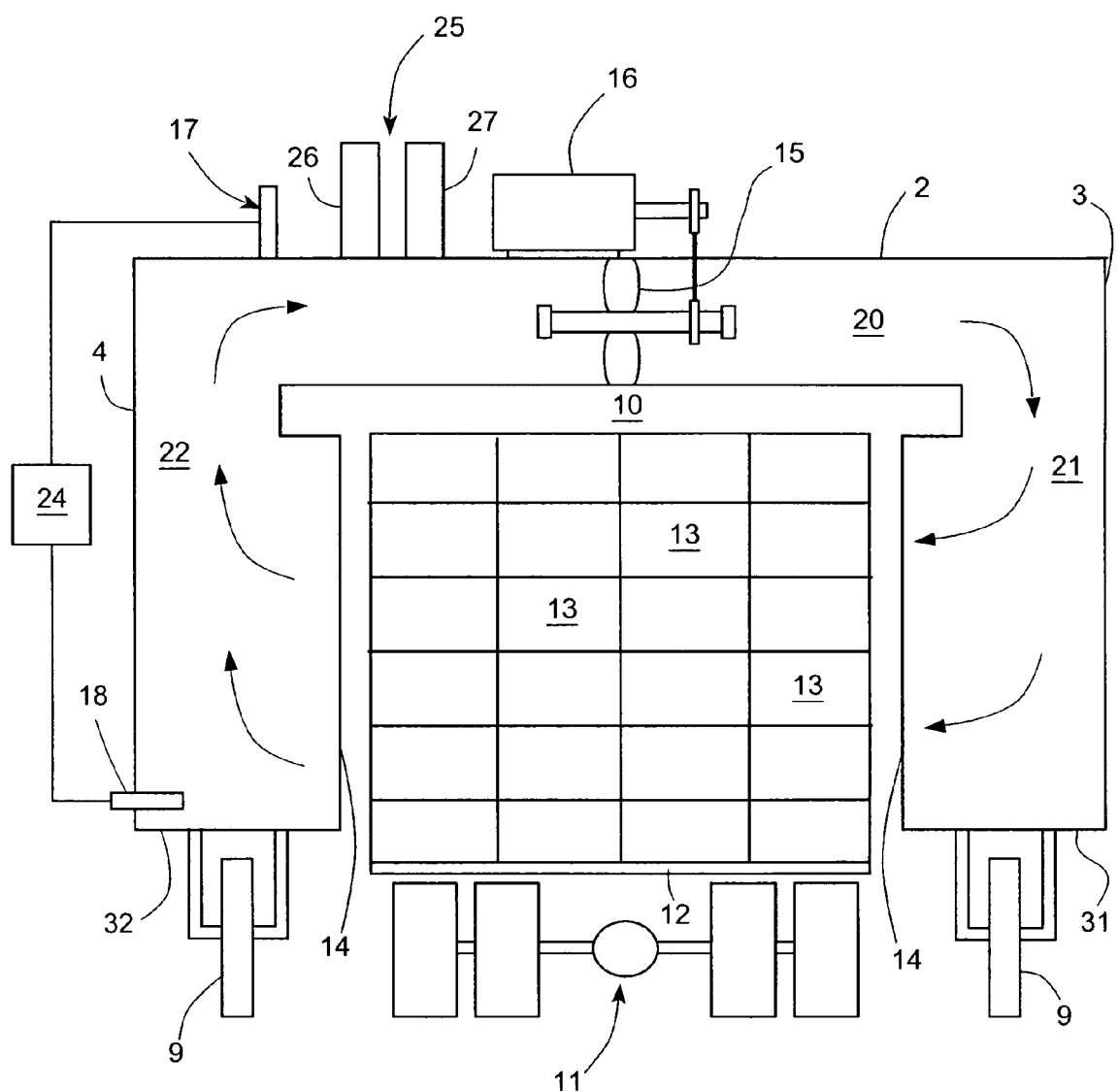
FIG. 2 is a cross-sectional view of apparatus according to the embodiment shown in FIG. 1.

One manner of changing the composition of the atmosphere and of subjecting the animals to the changing composition is to employ a structure through which the vehicle can pass. The vehicle can move through the structure while the structure (i.e. a shed or a garage) remains stationary, or the structure can be mobile (e.g. mounted on wheels) and pass along the length of the vehicle which remains stationary, or the vehicle and the structure can both move relative to the ground and relative to each other. The structure can be shorter than the vehicle, so that only a portion at a time of the vehicle is inside the structure (an example of this is illustrated in FIG. 3). Instead, the structure can be as long as or longer than the vehicle, so that the entire vehicle can fit inside the structure at one time. The composition of the atmosphere within the structure is then changed (as described below) so that animals that are in the cages within the structure are exposed to the changed atmosphere, breathe it, and are thereby brought to the desired state. After the treatment, the vehicle is moved relative to the structure so that the animals that have been breathing the changed atmosphere and have been brought to the desired state exit the structure. An example of this type of structure is illustrated in FIGS. 1-3 and is described in more detail below.

Another manner of changing the composition of the atmosphere to which the animals are subjected employs a flexible, removable wrapper such as a large sheet of plastic, tarpaulin, blanket, or the like, which is placed around all of the cages, or around selected ranks of cages, following which the composition of the atmosphere in the space within the wrapper is changed to expose the animals confined within that space to the changed atmosphere. After the treatment, when the animals have been brought to the desired state, the wrapper is removed.

Yet another manner of changing the composition of the atmosphere to which the confined animals are exposed employs a pit or equivalent depression below the grade of the ground which is at least as deep as the height of the vehicle plus the cages it is carrying, into which the vehicle is driven or rolled down a suitable ramp. The composition of the ambient atmosphere is then changed, preferably after barriers are closed above and around the vehicle and the cages to prevent excessive loss of the atmosphere while the animals on the vehicle are being exposed to the changed atmosphere. After the treatment, the animals are removed from the pit, either by removing the cages from the pit or by driving or rolling the vehicle out of the pit with the cages still on the vehicle.

In any of these embodiments, the gas treatment of the animals can be carried out while the vehicle is stationary, or while the vehicle remains in motion.

To bring about the desired change in the composition of the atmosphere to which the animals are exposed, a gaseous component or a mixture of gaseous components is fed into the atmosphere to which the animals are exposed. The component or mixture changes the composition of the atmosphere being breathed by the animals to a composition with a decreased oxygen content, so that breathing it brings the animals breathing it to the desired state of lethargy, unconsciousness or death.

The gaseous component or mixture of components fed into the circulating atmosphere should not themselves be toxic to the animal but inert, bringing about the desired state by gradually asphyxiating the animal i.e. by reducing the oxygen content of the atmosphere that the animal breathes. Suitable gases include carbon dioxide, nitrogen, argon, and mixtures thereof. It should be noted that the gas or mixture of gases being added can be oxygen-free or can contain oxygen, so long as the overall oxygen content of the atmosphere being breathed decreases.

The atmosphere that renders the animal lethargic generally comprises 5% to 25% of one or more of such gases. When the gas being added comprises nitrogen, the concentration thereof should be increased above the level already present in the ambient atmosphere. The one or more gases should be added in sufficient amount, over sufficient time, to bring the oxygen concentration in the atmosphere being breathed by the animal to below 10% by weight, preferably below 5% by weight, and more preferably to below 2% by weight, or even below 1% by weight. Adding carbon dioxide until the concentration thereof reaches about 20 weight %, for example, establishes an atmosphere that when breathed by poultry renders the poultry lethargic. The atmosphere that is thereby established is typically maintained for 30 to 60 seconds, during which the animal becomes at least lethargic.

Continuing to add such a component or components to increase its concentration in the circulating atmosphere, and thereby reducing the oxygen concentration of the atmosphere, converts the atmosphere to a composition that when breathed by the animal for a sufficient time renders the animal unconscious or dead. For reasons of economy and efficiency, the same component or components injected to render the animal lethargic should be added to render the animal unconscious or dead. Generally, the concentration of the component or components should be increased to about 45% to 55% by weight, e.g. of carbon dioxide or other inert gas or combination of inert gases, and even higher when the gas being added comprises nitrogen. When the circulating atmosphere has reached this composition, circulation should be maintained for another 1 to 6 minutes, until the animals are unconscious or dead (the length of time depends on the desired final state of the animal following this treatment, the animal, and its size).

The addition of the component that is to have the desired effect on the animal can be governed automatically by an automated controller into which has been inputted the desired concentration of the component(s), and optionally also the desired rate of increase of the concentration of the component (s), that responds to measurements of the concentration that are provided by a suitable probe by adding the component(s) to bring about the desired concentration. It can be advantageous to govern the addition of the component(s) in response also to a desired rate of increase of the concentration, as animals may exhibit convulsive behavior or other excessive movement if the concentration of the stunning component(s) increases too quickly.

The addition of gas can occur without interruption throughout a treatment cycle, or can occur intermittently. When the composition of the atmosphere has reached the desired level, addition can be discontinued but one may wish to continue addition at a reduced flow rate to account for losses of the component(s) being added to the surrounding atmosphere.

The length of time that is necessary for a given atmosphere to render the animal lethargic, and the length of time necessary to reach unconsciousness or death, will depend on the component or components being used, on the component concentration, and on the type of animal and its size, and can be determined experimentally.

When the animal being exposed to the circulating atmosphere has reached the desired state of lethargy, unconsciousness or lifelessness, addition of gas can be discontinued. Preferably, the atmosphere is replaced with ambient air.

When treatment of the animals is completed, the animal can be removed from its cage, either while the cage is still on the vehicle, or after the cage has been removed from the vehicle to facilitate taking the stunned animal out of its cage. The animal can be subjected to further processing which typically can include slaughtering and dressing the carcass in any desirable fashion.

The following is a description of one embodiment of the invention, which is illustrated in FIGS. 1-3. The embodiment is described with respect to treatment of poultry, although this embodiment can be practiced with any other animals instead.

Referring first to FIG. 1, apparatus useful in the practice of this invention includes enclosure 1 which has top 2 and sides 3 and 4. Top 2 and sides 3 and 4 are gas impermeable and may be formed of sheet metal or other gas impermeable material. Sides 3 and 4 should be attached to top 2 in any manner that does not permit gas to flow through the joints between top 2 and each of sides 3 and 4.

Enclosure 1 also includes front panel 5 in which is formed entrance 6, and rear panel 7 in which is formed exit 8. Preferably, entrance 6 and exit 8 lie along a line such that a vehicle can pass into entrance 6, through the interior of enclosure 1, and out exit 8, all along the same straight line. Thus, a passageway is formed by the vertical and horizontal edges in panels 5 and 7 that define entrance 6 and exit 8. The enclosure should also be wide enough to enclose lateral spaces 21 and 22 that are defined by sides 3 and 4 (respectively) and top 2 and front and rear panels 5 and 7. In overall dimensions, it is preferred to make the passageway through enclosure 1 high enough and wide enough that a vehicle such as a flatbed truck carrying stacked poultry cages can pass through it.

Enclosure 1 is supported in any of a number of possible ways. One support comprises a set of wheels 9, as illustrated in FIGS. 1 and 2, which have the advantage that they enable enclosure 1 to be easily moved in service, and into and out of service, as desired by the operator. Other ways to support enclosure 1 so that it is movable include mounting it on a set of rails, or suspending it from a set of rails. Alternatively, enclosure 1 can be suspended from overhead structure such as a gantry.

As seen in FIG. 2, upper plate 10 is provided within enclosure 1. It is located over the passageway within enclosure 1 that is occupied by a vehicle 11 when a vehicle (or part of a vehicle) is present in the enclosure 1. Upper plate 10 preferably has a width 90% to 120% of the width of the passageway (that is, the distance across entrance 6 and exit 8) and preferably extends in length (that is, in the direction parallel to a line from the entrance of the enclosure to the exit) that is 50% to 100% of the length of the passageway. Upper plate 10 is gas-impermeable and may be constructed of sheet metal. Upper plate 10 is located below top surface 2 of the enclosure, thereby defining space 20, which is described further below. Upper plate 10 is located above the uppermost poultry cage on a vehicle 11 when a vehicle is in the passageway of enclosure 1, and close enough to the uppermost poultry cage to provide circulation of gaseous atmosphere through the cages 13 as described below. The circulation and the resulting stunning of the poultry are more effective as upper plate 10 is closer to the uppermost poultry cage. Upper plate 10 can be fixed in position, or it can be held by structure which permits the height of upper plate 10 to be adjusted to accommodate the height of the uppermost poultry cage on any given vehicle that has entered the enclosure 1.

Impeller 15 is located within enclosure 1. As shown, impeller 15 can be situated on top of upper plate 10, but impeller can be situated in either of the lateral spaces. Impeller 15 can be a fan of conventional construction. It is powered by drive 16, which can represent a source of electrical power for an electric motor that rotates fan 15, or which can represent an electric motor that turns a shaft which is connected by a belt to the shaft of fan 15. The axis of gas flow through impeller 15 is oriented so that impeller 15 drives gaseous atmosphere through a flow circuit that runs from space 20, into lateral space 21, then through a rank of cages or through several (preferably 2 to 4) ranks of cages adjacent to one another (i.e. side-by-side when seen from one side of the vehicle), into lateral space 22, then again into space 20. The arrows in FIG. 2 illustrate such a flow circuit.

FIG. 2 illustrates enclosure 1 when such a vehicle 11 carrying cages 13 is in the aforementioned passageway. Vehicle 11 can be any carrier that conforms to the description given herein, such as a trailer on wheels or a skid on wheels or rails, but the invention will be described with reference to a flatbed trailer. Indeed, a significant advantage of the present invention is that it can be practiced with trucks carrying caged poultry arriving from the poultry farm at which the poultry was caged and then placed onto the trucks, without requiring any unloading step prior to the stunning or asphyxiation of the birds.

Vehicle 11 preferably includes a bottom plate 12 which is preferably gas-impermeable. Cages 13 either directly rest on the bottom of the vehicle or are stacked onto cages that directly rest on the bottom of the vehicle. Preferably, to maximize efficient processing of larger numbers of poultry, each rank of cages is arrayed across the full width of the vehicle. However, fewer cages 13 than those shown in FIG. 2 can be processed in the practice of the invention on a given vehicle-load of cages.

The cages 13 are of any design that can hold a chicken or turkey and that permits gaseous atmosphere to pass from outside the cage into and through the cage. Preferably, the tops, bottoms and sides of the cages are planar, to facilitate stacking them onto a vehicle such as shown in FIG. 2.

Preferably, a barrier is provided that retards loss of the atmosphere within the enclosure to the air outside the enclosure, downwardly past the bottom edges of the sides 3, 4 and of the front and rear panels 5 and 7. Such a barrier can be provided by constructing the enclosure so that the lateral spaces 21 and 22 are bounded on the bottom by rigid or flexible structure 31 and 32 that closes off the bottom of each lateral space and terminates at or near the vertical edges of the entrance 6 and exit 8.

Enclosure 1 also includes injector 17 which injects into the atmosphere that is to circulate within the fluid flow circuit, a gaseous component that renders the atmosphere capable of rendering the poultry lethargic, and that preferably is capable of rendering the poultry unconscious or dead (when breathed in sufficient concentration for a sufficient period of time) if that is the desired effect on the poultry. If the desired effect on the poultry is to be caused by a combination of more than one component, there can be one injector that injects a mixture of the components, or there can be a separate injector for each of the components that make up the stunning atmosphere. The injector 17 (or the several injectors, if necessary) preferably inject into space 20 at a point upstream of impeller 15. Each injector is connected to a source of the component being injected (such as a storage tank) by a suitable feed line equipped with flow control valving.

Preferably, a probe 18 is provided that measures the composition of the atmosphere within enclosure 1, or at least measures the concentration within that atmosphere of the component or components that are to have the desired effect (i.e., lethargy, unconsciousness, or death) on the poultry. Probe 18 is connected by conventional wiring to suitable electronic apparatus 24 by which an operator or, preferably, an automated controller, can respond to the measurement taken by the probe and adjust as necessary the composition of the circulating atmosphere by, for instance, turning on the flow of the component through the injector, turning off that flow through the injector, adjusting the feed rate at which the component is injected into the enclosure, and/or adjusting the concentration of the component in the stream that is injected into the enclosure. More preferably, the feeding of a component or components via the injector is automatically governed in response to measurements taken by probe 18 of the concentration of the component. Controller and associated equipment that perform the desired function, i.e. determining the concentration of the component, and determining (as a function of the concentration of the component in the flow circuit and of the desired concentration in the flow circuit) whether to adjust the flow of the component through the injector, when to turn on and shut off that flow, and the like, is familiar to people knowledgeable in the field of controlling gas atmospheres, and is commercially available.

Enclosure 1 also includes apparatus with which the atmosphere within the flow circuit can be exhausted from the enclosure after poultry has reached the desired state of being rendered lethargic, unconscious or dead, and with which fresh air can be fed into the enclosure. Suitable apparatus includes an exhaust vent 26, which can be opened or closed as desired by the operator, extending from the interior of the enclosure to the air outside the enclosure, through which atmosphere within the enclosure can be vented, and feed vent 27 through which ambient air can be drawn into the enclosure. The functions of vents 26 and 27 can if desired be carried out by two separate vents or by one vent that performs both functions.

An optional but preferred additional feature present in enclosure is distributor 14, which is a device through which circulating atmosphere passes and which provides that the mass flow rates at which the atmosphere passes to the highest-elevated cage 13 (i.e. closest to upper plate 7) and to the lowest cage (i.e. closest to bottom plate 12) do not differ by more than 20% and preferably by not more than 10%. That is, distributor 14 promotes uniform flow rates of the gaseous atmosphere that passes through to the caged poultry, unaffected by the height of a poultry cage above the bottom plate 12. A distributor 14, if present, is preferably situated in or at the downstream face of lateral space 21, upstream of the rank or ranks of cages to which circulating stunning atmosphere is to be directed. Distributor 14 is preferably a thin sheet of metal or plastic with a large number of perforations through it. The sizes of the perforations can be different at different locations in the distributor, so that when gaseous atmosphere in lateral space 21 is placed under pressure (such as by the action of impeller 15) the atmosphere flow rate to all cages in the rank or ranks is relatively uniform. The top edge of a distributor such as distributor 14 extends from a side edge of upper plate 10, and it should extend downward to the level of the lowest cage to which stunning atmosphere is to be directed. Distributor 14 is preferably of a height and width sufficient to fill the space through which circulating gas passes in the flow circuit. A distributor having the same characteristics and functionality can be situated in or at the upstream face of lateral space 22, downstream of the rank or ranks of cages through which circulating atmosphere has flowed.

In a preferred mode of operation, a vehicle 11 such as a truck carrying or pulling a flat bed stacked with cages of poultry is positioned in the enclosure as shown in FIG. 3. One rank of cages and preferably 2 to 4 ranks of cages are within enclosure 1. Preferably, when a vehicle's load of cages is first being subjected to treatment by this invention, the first cages that are within the enclosure are the cages closest to the front of the vehicle. If the position of upper plate 10 is adjustable, then when carrier 11 has entered enclosure 1 upper plate 10 is preferably moved downward as close as possible to the uppermost poultry cage while still enabling the carrier to move without having the upper plate dislodge any poultry cages.

In an optional but preferred embodiment, a vertical gas-impermeable sheet is placed across the width of the vehicle, one on each side of the rank or ranks of cages that are about to be exposed to the stunning atmosphere. Each sheet should be as high as the stack of cages in the rank or ranks, and each sheet should be as wide as the rank or ranks are deep (that is, as seen across the width of vehicle 11). The sheets improve efficiency by reducing the amount of circulating stunning gas atmosphere that is lost from the front and rear walls of the cages and that thus avoids being circulated in the desired flow path described herein.

The efficiency and effectiveness of the circulating atmosphere in bringing the poultry to the desired state of lethargy, unconsciousness or death are increased by decreasing the size of the gap between the face(s) of cages exposed to lateral spaces 21 and 22, and the edges closest to the vehicle of the surfaces that define lateral spaces 21 and 22 (i.e., in the case of lateral space 21, the edges of front panel 5, rear panel 7, and bottom structure 31). Satisfactory operation can be achieved even with a gap of up to a few inches.

However, as another optional feature, a movable flexible skirt can be provided that helps to channel the atmosphere that is circulating within the aforementioned flow circuit from the lateral space 21 to the cages into which the atmosphere is to be directed, and out of such cages into lateral space 22. The upstream edges of the upstream skirt and the downstream edges of downstream skirt are preferably secured to the adjacent side edges of upper plate 10, and to the interior surfaces of front panel 5 and of rear panel 7, and to either the interior surfaces of sides 3 and 4 or to the interior surface of bottom structure 31 and 32. The downstream edge of the upstream skirt and the upstream edge of the downstream skirt should have a sufficient circumferential length that they each define an opening (through which the circulating atmosphere flows) as tall and as wide as the height and width of the rank or ranks of cages through which the atmosphere is to be circulated. These edges can if desired be joined to a gasket or other collar-like structure having the length and width of the rank or ranks of cages to be treated; using such a gasket or similar device facilitates handling the skirt material. Each skirt should be of a length adequate to extend from the areas at which it is attached to the structure of the enclosure, to the rank or ranks of cages through which the circulating atmosphere is to be directed. Suitable materials of construction for the skirt include heavy cloth, plastic (such as flexible polyethylene or polypropylene sheeting) or sections of stiffer plastic material hinged together.

With the vehicle in position so that a rank or several ranks of cages are within the enclosure, and with the aforementioned apparatus 25 for exhausting atmosphere from the enclosure and for feeding ambient air into the enclosure closed, skirts (if present) are optionally positioned to help channel atmosphere flow through the selected rank or ranks of cages, and one or more components are injected via the aforementioned one or more injectors 17 to impart to the atmosphere a composition which, when breathed by the poultry in the selected rank or ranks of cages, will begin to bring the poultry to the desired state i.e. lethargic, unconscious or dead. The impeller should at this time be operating, to circulate the component or components that are injected into the circulating atmosphere.

As mentioned above, the injection of the component that is to have the desired effect on the poultry can be governed automatically by an automated controller into which has been inputted the desired concentration of the component(s), and optionally also the desired rate of increase of the concentration of the component(s), that responds to measurements of the concentration that are provided by probe 18 by injecting the component(s) to bring about the desired concentration. It can be advantageous to govern the injection of the component(s) in response also to a desired rate of increase of the concentration, as birds may exhibit convulsive behavior such as wing flapping and other excessive movement if the concentration of the stunning component increases too quickly.

Thus, the injection can occur without interruption throughout a treatment cycle, or can occur intermittently. When the composition of the atmosphere has reached the desired level, injection can be discontinued but one may wish to continue injection at a reduced flow rate to account for losses of the atmosphere out of the flow circuit.

When the poultry being exposed to the circulating atmosphere has reached the desired state of lethargy, unconsciousness or lifelessness, injection of gas is discontinued. The atmosphere is exhausted from the flow circuit, for instance through exhaust vent 26, and ambient air is drawn into the flow circuit, for instance through feed vent 27. Continuing to operate the impeller during this stage helps to exhaust the stunning atmosphere from the enclosure and to draw in ambient air. The aforementioned optional skirts, if present, can be retracted from the sides of the vehicle 11 at this time.

The vehicle and the enclosure are moved relative to each other so that another rank or adjacent ranks of cages are in position to be treated in the same sequence of steps just described. The aforementioned exhausting of stunning atmosphere and reintroduction of ambient air can be carried out while this movement is occurring, although it is preferred that poultry next to be treated is not exposed at the outset to a high concentration of a stunning atmosphere. Preferably, ranks of cages should be treated in a sequence from the cages closest to the front of the vehicle, along the length of the vehicle in order, concluding with the cages closest to the rear of the vehicle, to minimize excessive movement of the vehicle and the enclosure, and to enable poultry in the frontmost cages to be removed from the vehicle even while cages remaining on the vehicle are being treated or are still awaiting treatment.

Movement of the vehicle with respect to the enclosure can be carried out in any of several different ways. The vehicle can be driven, that is, moved or pulled under the power of the vehicle itself just as though the vehicle were traveling under its own power on the open road. Alternatively, the vehicle (the entire truck, if it is a unitary vehicle or a cab unit pulling a trailer with the caged poultry, or only the trailer carrying the caged poultry) can be drawn into and through the enclosure by apparatus such as a cable attached to the front of the vehicle by which the vehicle is pulled through the enclosure, or by apparatus that engages the underside of the vehicle with a drive mechanism that draws the vehicle through the enclosure (such as the sort of mechanism employed in automatic car washes).

In other alternatives of repositioning the enclosure to circulate the stunning atmosphere through successive ranks of cages, the enclosure can be moved relative to the ground and relative to the vehicle, while the vehicle is stationary or while the vehicle is also moving relative to the ground. This alternative is facilitated by mounting the enclosure on wheels or on rails so that the enclosure can move relative to the ground. In the alternatives in which the enclosure moves, the enclosure can be moved n a direction from the front of the vehicle to the rear of the vehicle, or in the opposite direction, or back and forth alternating between those two directions.

The length of time that is necessary for a given atmosphere to render the poultry lethargic, and the length of time necessary to reach unconsciousness or death, will depend on the component or components being used, and on the component concentration, and can be determined experimentally.

Referring again to FIG. 3, when the vehicle begins to emerge from the exit of the enclosure so that caged poultry which has been rendered lethargic, unconscious or dead is accessible from outside the enclosure, the poultry in the cage or cages that have become accessible are removed from the vehicle at unloading area 40 for further processing of the poultry. The poultry is removed from its cages, either while the cages are still on the vehicle, or after each cage has been removed from the vehicle to facilitate taking the stunned bird out of its cage. Further processing typically will include slaughtering the poultry, and dressing the carcass in any desirable fashion. In a preferred embodiment, caged poultry that has been rendered lethargic, unconscious or dead by the treatment described herein is removed from the front part of the vehicle while other poultry caged in the more rearward areas of the vehicle are still undergoing stunning within the enclosure or are awaiting treatment.

The method and apparatus of the present invention provide several advantages. The invention provides the advantages that other techniques for stunning the poultry provide, such as reducing the difficulty and hazards faced by workers who have to handle live, fully awake birds. But the invention provides these at considerably less cost both in the cost of setting the necessary apparatus and the cost of operating it. Also, the apparatus can operate in a much smaller space than is required by other stunning operations. In addition, the overall time required to treat (stun) a given vehicle-load of poultry is reduced, compared to other stunning techniques, because of the rapidity with which the invention works and because while some of the poultry is still being stunned it is possible to be already delivering stunned (lethargic, unconscious or deceased) birds from that vehicle-load for further processing.

What is claimed is:

1. A method for controlled atmosphere stunning an animal to bring it into a desired state selected from the group consisting of lethargy, unconsciousness, or death, comprising:
    (a) providing a batch of animals at a treatment location alive and confined in cages, in an atmosphere that does not bring the animals breathing it to a state of lethargy, unconsciousness or death, on a flatbed truck or trailer truck which has transported the confined animals to the treatment location from a location other than the treatment location,
    (b) moving the flatbed truck or trailer truck thru a stunning enclosure;
    (c) adding gas other than oxygen to said atmosphere while the animals are so confined in cages and stationary on the flatbed truck or trailer truck and within the stunning enclosure thereby reducing the oxygen content of the atmosphere in which the animals are so confined to bring the batch of animals breathing the atmosphere to said desired state, and recirculating said atmosphere through said stunning enclosure and truck at least until the batch of animals breathing the atmosphere are thereby brought into said desired state, and
    (d) removing the animal from said cages on said flatbed truck or trailer truck only after the animals have been brought to said desired state.

2. The method according to claim 1 where the gas which is added in step (c) comprises one or more of nitrogen, carbon dioxide, and argon.

3. The method according to claim 1 wherein said animals are poultry.

4. The method of claim 1 wherein the gas added in step (c) comprises carbon dioxide.

5. The method of claim 1 wherein said desired state is unconsciousness.

6. The method of claim 1 wherein said desired state is death.

7. The method according to claim 1 wherein step (c) is carried out while at least the portion of the flatbed truck or trailer-truck on which the animals are confined is within the stunning enclosure.

8. The method according to claim 7 wherein the flatbed truck or trailer-truck is located entirely within said stunning enclosure.

9. The method according to claim 7 wherein the flatbed truck or trailer-truck is located partially within said stunning enclosure.

10. The method according to claim 1 wherein the concentration of said gas added in step (c) in said atmosphere is increased to a first level, and then is increased to a second level.

11. A method for controlled atmosphere stunning of animals to bring the animals into a desired state selected from the group consisting of lethargy, unconsciousness, or death, comprising:
    (a) providing a stunning enclosure having a gas impermeable top, gas impermeable sides joined to the gas impermeable top, a gas impermeable front panel, a gas impermeable rear panel, an entrance in the front panel and an exit in the rear panel, the entrance and exit defining a passageway through the stunning enclosure through which a flatbed truck or trailer truck on the ground can pass, and a gas impermeable upper plate within the stunning enclosure located above the flatbed truck or trailer truck and below the top of the stunning enclosure, and wherein the front and rear panels, the top and each side define lateral spaces within the stunning enclosure on each side of the passageway,
    (b) positioning the flatbed truck or trailer truck having a bottom plate and carrying the animals in two or more ranks of cages whose walls are permeable to the atmosphere outside the cage walls within the stunning enclosure passageway so that at least one rank of cages is stationary inside the stunning enclosure,
    (c) establishing a recirculating flow circuit in the stunning enclosure from the space above the upper plate into one lateral space, through a selected rank or ranks of said cages on the flatbed truck or trailer truck, into the other lateral space, and then into the space above said upper plate,
    (d) injecting gas into the atmosphere within said flow circuit to impart a stunning atmosphere which brings the animals breathing the stunning atmosphere to said desired state, and circulating said stunning atmosphere through said flow circuit at least until the animals in said rank or ranks of cages on the flatbed truck or trailer truck are brought into said state, and
    (e) exhausting the stunning atmosphere formed in step (d) from said flow circuit and feeding ambient air into the flow circuit.

12. The method of claim 11 wherein the animals are poultry.

13. The method of claim 11 wherein the gas injected into said atmosphere in step (d) comprises carbon dioxide.

14. The method of claim 11 wherein said desired state is unconsciousness.

15. The method of claim 11 wherein said desired state is death.

16. The method of claim 11 wherein said enclosure further comprises a probe that measures the concentration in said circuit of the gas that is injected into said circuit in step (d), and the injection in step (d) of said gas into said circuit is automatically governed in response to measurements taken by said probe of the concentration of said gas in said circuit.

17. The method of claim 11 wherein said enclosure also comprises a gas distributor positioned in said flow circuit in the lateral space that is upstream of said selected rank or ranks of cages and a gas distributor positioned in said flow circuit downstream of said selected rank or ranks of cages.

18. The method of claim 11 further comprising the steps of:
(f) moving the flatbed truck or trailer truck with respect to the stunning enclosure to remove said selected rank or ranks of cages from said flow circuit and to place another selected rank or ranks of cages being carried by said flatbed truck or trailer truck into said stunning enclosure, and
(g) repeating steps (c) through (e) until the animals in all cages on said flatbed truck or trailer truck have been stunned.

19. Apparatus for controlled atmosphere stunning of animals with gas, comprising:
(a) a stunning enclosure having a gas impermeable top, gas impermeable sides joined to the gas impermeable top, a gas impermeable front panel, a gas impermeable rear panel, an entrance in the front panel and an exit in the rear panel, the entrance and exit defining a passageway through the enclosure through which a flatbed truck or trailer truck can pass, the front and rear panels, the top and each side defining lateral spaces within the stunning enclosure on each side of the passageway, and a gas impermeable upper plate within the stunning enclosure located above the flatbed truck or trailer truck and below the top of the stunning enclosure,
(b) an impeller for circulating an atmosphere through a flow circuit through the stunning enclosure and truck extending from the space above the upper plate into one lateral space, through a selected rank or selected adjacent ranks of cages on the flatbed truck or trailer truck positioned in said passageway, into the other lateral space, and then into the space between said upper plate and the top of the stunning enclosure,
(c) an injector for injecting gas into the atmosphere within said flow circuit, and
(d) apparatus for exhausting the atmosphere within said flow circuit into the ambient air and feeding ambient air into the atmosphere in said flow circuit.

20. The apparatus of claim 19 further comprising a probe within said enclosure that measures the concentration in said circuit of the gas that is injected into said circuit by said injector, and a controller which automatically governs the injection of said gas into said circuit in response to measurements taken by said probe of the concentration of said gas in said circuit.

21. The apparatus of claim 19 wherein the enclosure can move with respect to the ground.

22. The apparatus of claim 19 wherein said enclosure also comprises a gas distributor positioned in said flow circuit in the lateral space that is upstream of said selected rank or ranks of cages.

23. The apparatus of claim 19 wherein said enclosure also comprises a gas distributor positioned in said flow circuit in the lateral space that is upstream of said rank or ranks of cages, and a gas distributor positioned in said flow circuit in the lateral space that is downstream of said selected rank or ranks of cages.

* * * * *